United States Patent
Wang

(10) Patent No.: US 11,683,748 B2
(45) Date of Patent: Jun. 20, 2023

(54) NETWORK SLICE SELECTION METHOD, DEVICE, AND SYSTEM

(71) Applicant: HUAWEI TECHNOLOGIES CO., LTD., Shenzhen (CN)

(72) Inventor: Yuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 17/186,729

(22) Filed: Feb. 26, 2021

(65) Prior Publication Data
US 2021/0185602 A1    Jun. 17, 2021

Related U.S. Application Data

(63) Continuation of application No. PCT/CN2019/103852, filed on Aug. 30, 2019.

(30) Foreign Application Priority Data

Aug. 31, 2018 (CN) .......................... 201811014623.9

(51) Int. Cl.
*H04W 48/16* (2009.01)
*H04W 48/18* (2009.01)

(52) U.S. Cl.
CPC ........... *H04W 48/18* (2013.01); *H04W 48/16* (2013.01)

(58) Field of Classification Search
CPC ............................. H04W 48/16; H04W 48/18
See application file for complete search history.

(56) References Cited

U.S. PATENT DOCUMENTS

| | | | | |
|---|---|---|---|---|
| 2017/0303259 A1* | 10/2017 | Lee | ........................ | H04W 72/51 |
| 2018/0227871 A1* | 8/2018 | Singh | .................... | H04W 48/18 |
| 2018/0227873 A1* | 8/2018 | Vrzic | .................... | H04W 28/26 |
| 2018/0317133 A1* | 11/2018 | Sciancalepore | ....... | H04W 16/02 |
| 2019/0230584 A1* | 7/2019 | Lou | ........................ | H04W 76/12 |

FOREIGN PATENT DOCUMENTS

| | | |
|---|---|---|
| CN | 105813195 A | 7/2016 |
| CN | 106375987 A | 2/2017 |

(Continued)

OTHER PUBLICATIONS

3GPP TS 23.502,V15.2.0, "3rd Generation Partnership Project; Technical Specification Group Services and System Aspects; Procedures for the 5G System; Stage 2 (Release 15)", Jun. 19, 2018, pp. 1-308.

(Continued)

*Primary Examiner* — Qutbuddin Ghulamali
(74) *Attorney, Agent, or Firm* — Hauptman Ham, LLP

(57) ABSTRACT

Embodiments of this application provide a network slice selection method. The method includes: A first network device obtains user characteristic information of a current user of a first terminal, where the user characteristic information includes one or more pieces of single network slice selection assistance information S-NSSAI corresponding to the current user. The first network device determines, based on the user characteristic information, allowed NSSAI corresponding to the first terminal, where the allowed NSSAI includes the one or more pieces of S-NSSAI; or when the first network device does not support serving a network slice indicated in the one or more pieces of S-NSSAI, the first network device determines, based on the one or more pieces of S-NSSAI, a second network device that supports serving the network slice indicated in the one or more pieces of S-NSSAI.

20 Claims, 6 Drawing Sheets

(56) References Cited

FOREIGN PATENT DOCUMENTS

| CN | 106572516 | A  | 4/2017  |
|----|-----------|----|---------|
| CN | 107580360 | A  | 1/2018  |
| CN | 107919969 | A  | 4/2018  |
| CN | 108323245 | A  | 7/2018  |
| CN | 108401275 | A  | 8/2018  |
| EP | 3557905   | A1 | 10/2019 |
| WO | 2017058067| A1 | 4/2017  |
| WO | 2018111030| A1 | 6/2018  |
| WO | 2018153346| A1 | 8/2018  |

OTHER PUBLICATIONS

Drafting Group(ED: Patrice Hede et al:SA WG2 Meeting #122, draft-S2-174991, "Network Slice instance selection", Jun. 2017, total 20 pages.

Extended European Search Report issued in European Application No. 19854391.0, dated Sep. 9, 2021, pp. 1-11, European Patent Office, Munich, Germany.

ZTE, Idle mode behaviour for NW slice. 3GPP TSG-RAN WG2 Meeting #99, Berlin, Germany, Aug. 21-25, 2017, R2-1708109, 4 pages.

Chinese Notice of Allowance issued in corresponding Chinese Application No. 201811014623.9, dated Mar. 4, 2021, pp. 1-4, State Intellectual Property Office of People's Republic of China, Beijing, China.

Huawei (editor), Network Slice instance selection SA WG2 Meeting #122, Jun. 26-30, 2017, Cabo, Mexico, S2-175191, 25 pages.

Chinese Office Action issued in corresponding Chinese Application No. 201811014623.9, dated Aug. 5, 2020, pp. 1-9, State Intellectual Property Office of People's Republic of China, Beijing, China.

International Search Report issued in corresponding International Application No. PCT/CN2019/103852, dated Nov. 28, 2019, pp. 1-9, China National Intellectual Property Administration, Beijing, China.

\* cited by examiner

NETWORK SLICE SELECTION METHOD, DEVICE, AND SYSTEM

CROSS-REFERENCE TO RELATED APPLICATIONS

This application is a continuation of International Application No. PCT/CN2019/103852, filed on Aug. 30, 2019, which claims priority to Chinese Patent Application No. 201811014623.9, filed on Aug. 31, 2018. The disclosures of the aforementioned applications are hereby incorporated by reference in their entireties.

TECHNICAL FIELD

This application relates to the field of communications technologies, and in particular, to a network slice selection method, a device, and a system.

BACKGROUND

A network slice (network slice) is a network used to support logical isolation between a particular network capability and a network characteristic, and may include an entire network in an end-to-end (end-to-end, E2E) manner, or some network functions may be shared in a plurality of network slices. The network slice is a key technology for meeting a differentiated network requirement of a 5th generation (5th generation, 5G) mobile communications technology provided in the 3rd generation partnership project (3rd generation partnership project, 3GPP). Usually, network features of different network slices are different, and network slices are required to be isolated from each other and not affect each other. For example, a network slice of an augmented reality (augmented reality, AR) service or a virtual reality (virtual reality, VR) service requires a high-bandwidth and a low-latency. A network slice of an internet of things (internet of things, IOT) service requires supporting access of a large quantity of terminals, but requires a low bandwidth, and has no requirement on a latency.

With the continuous evolution of network slicing technologies, vertical industries such as industry, enterprise, home, entertainment, and game provided new application scenarios and requirements for network slicing. In a new application scenario, one terminal may be shared by a plurality of users. When using a same terminal, different users can enjoy, based on different user requirements or configurations, different customized services provided by a network. Specifically, the different users can access different network slices. For example, a game company classifies users into three grades: gold, silver, and bronze, and the game company leases three network slices from a network operator, and respectively provide the three network slices for the users of the three grades for access, namely, gold, silver, and bronze. A network slice for a gold user to access can provide a more stable transmission latency and a higher bandwidth, and can provide better game experience for the gold user. It is assumed that user A subscribes to a bronze user of the game company, and then the game company allocates a game terminal to the user A. When the user A logs in by using the game terminal, the operator network needs to enable the game terminal to access the network slice corresponding to the bronze user. Subsequently, if user B who subscribes to a gold user of the game company visits the user A, when the user B logs in by using the game terminal, the operator network needs to enable the game terminal to access the network slice corresponding to the gold user, to ensure the rights and interests of the gold user.

However, in an existing network slice selection method, a corresponding network slice is selected based on a terminal. For example, a terminal 1 is used as an example, and the existing network slice selection method may be specifically: The terminal 1 adds requested (requested) network slice selection assistance information (network slice selection assistance information, NSSAI) to a registration request. Further, a network device such as an access and mobility management function (access and mobility management function, AMF) network element may determine, based on the requested NSSAI of the terminal 1 and subscribed (subscribed) NSSAI of the terminal 1 that is obtained from a subscription database, allowed (allowed) NSSAI corresponding to the terminal 1, and return the allowed NSSAI to the terminal 1, so that the terminal 1 subsequently may be served by a network slice identified in the allowed NSSAI. Alternatively, the terminal 1 may not add requested NSSAI to a registration request, and a network device such as an AMF network element may directly determine, based on subscribed NSSAI of the terminal 1 obtained from a subscription database, allowed NSSAI corresponding to the terminal 1, and return the allowed NSSAI to the terminal 1, so that the terminal 1 subsequently may be served by a network slice identified in the allowed NSSAI.

If the foregoing network slice selection method is applied to the foregoing scenario in which a plurality of users share one terminal, no matter which user uses the game terminal, the game terminal can access only to the network slice corresponding to the bronze user. Therefore, how to enable a terminal to access different network slices based on different users is a problem that urgently needs to be resolved at present.

SUMMARY

Embodiments of this application provide a network slice selection method, a device, and a system, to select and access a corresponding network slice based on a user.

To achieve the foregoing objective, the following technical solutions are used in the embodiments of this application.

According to a first aspect, a network slice selection method is provided. The method includes: A first network device obtains user characteristic information of a current user of a first terminal, where the user characteristic information includes one or more pieces of single network slice selection assistance information S-NSSAI corresponding to the current user. The first network device determines, based on the user characteristic information, allowed NSSAI corresponding to the first terminal, where the allowed NSSAI includes the one or more pieces of S-NSSAI; or when the first network device does not support serving a network slice indicated in the one or more pieces of S-NSSAI, the first network device determines, based on the one or more pieces of S-NSSAI, a second network device that supports serving the network slice indicated in the one or more pieces of S-NSSAI. Based on this solution, on one hand, the first network device can obtain the user characteristic information of the current user of the first terminal, where the user characteristic information includes the one or more pieces of S-NSSAI corresponding to the current user of the first terminal, and the first network device can determine, based on the user characteristic information, the allowed NSSAI corresponding to the first terminal, where the allowed NSSAI includes the one or more pieces of S-NSSAI. Therefore, a corresponding network slice can be selected and accessed based on the user. On the other hand, after the first network device obtains the user characteristic information including the one or more pieces of S-NSSAI corresponding to the current user of the first terminal, if the first network device cannot serve the network slice indicated in the one or more pieces of S-NSSAI, that is, a function of the first network device is insufficient to provide a corresponding network capability such as a low latency or high reliability, network device reselection may be triggered, to redirect a message related to the first terminal to the second network device that can serve the network slice indicated in the one or more pieces of S-NSSAI.

In a possible design, after the first network device determines the allowed NSSAI corresponding to the first terminal, the method further includes: The first network device sends the allowed NSSAI to the first terminal, where the allowed NSSAI is used to indicate one or more network slices that the first terminal is allowed to access. Based on this solution, the first terminal can learn the allowed NSSAI corresponding to the first terminal, and then select and access the corresponding network slice based on the allowed NSSAI.

In a possible design, that a first network device obtains user characteristic information of a current user of a first terminal includes: The first network device sends a first message to the first terminal, where the first message is used to request a user identifier of the current user of the first terminal. The first network device receives the user identifier from the first terminal. The first network device obtains the user characteristic information of the current user of the first terminal based on the user identifier. Based on this solution, the first network device obtains the user characteristic information of the current user of the first terminal.

In a possible design, that the first network device obtains the user characteristic information of the current user of the first terminal based on the user identifier includes: The first network device sends a second message to a database network element or an authentication server, where the second message carries the user identifier and is used to request the user characteristic information of the current user of the first terminal. The first network device receives the user characteristic information from the database network element or the authentication server. To be specific, the first network device can obtain the user characteristic information of the current user of the first terminal from the database network element or the authentication server based on the user identifier.

In a possible design, before the first network device obtains the user characteristic information of the current user of the first terminal, the method further includes: The first network device receives a third message from the first terminal, where the third message includes first indication information, and the first indication information is used to indicate that the first terminal has the user characteristic information. The first network device determines, based on the first indication information, that the first terminal has the user characteristic information. Based on this solution, the first network device can determine that the first terminal has the user characteristic information.

In a possible design, the third message includes requested NSSAI of the first terminal, and the first indication information is tag information in S-NSSAI included in the requested NSSAI of the first terminal. To be specific, the requested NSSAI of the first terminal includes the S-NSSAI including the tag information, and the tag information is used to indicate that the first terminal has the user characteristic information.

In a possible design, before the first network device obtains the user characteristic information of the current user of the first terminal, the method further includes: The first network device obtains subscription data of the first terminal from the database network element, where the subscription data includes second indication information, and the second indication information is used to indicate that the first terminal has the user characteristic information. The first network device determines, based on the second indication information, that the first terminal has the user characteristic information. Based on this solution, the first network device can determine that the first terminal has the user characteristic information.

In a possible design, the subscription data includes subscribed NSSAI of the first terminal, and the second indication information is tag information in S-NSSAI included in the subscribed NSSAI of the first terminal. To be specific, the subscribed NSSAI of the first terminal includes the S-NSSAI including the tag information, and the tag information is used to indicate that the first terminal has the user characteristic information.

In a possible design, that the first network device determines, based on the one or more pieces of S-NSSAI, a second network device that supports serving the network slice indicated in the one or more pieces of S-NSSAI includes: The first network device sends a fourth message to a slice selection function network element, where the fourth message carries the one or more pieces of S-NSSAI, and is used to request a network device that supports serving the network slice indicated in the one or more pieces of S-NSSAI. The first network device receives information about the second network device from the slice selection function network element. Based on this solution, the first network device can determine the second network device that supports serving the network slice indicated in the one or more pieces of S-NSSAI.

In a possible design, that the first network device determines, based on the one or more pieces of S-NSSAI, a second network device that supports serving the network slice indicated in the one or more pieces of S-NSSAI includes: The first network device sends a fifth message to a slice selection function network element, where the fifth message carries the one or more pieces of S-NSSAI, and is used to request a network device that supports serving the network slice indicated in the one or more pieces of S-NSSAI. The first network device receives information about a candidate network device set from the slice selection function network element. The first network device selects the second network device from the candidate network device set based on the information about the candidate network device set. Based on this solution, the first network device can determine the second network device that supports serving the network slice indicated in the one or more pieces of S-NSSAI.

According to a second aspect, a first network device is provided. The first network device has a function of implementing the method described in any one of the first aspect and the possible designs. The function may be implemented by using hardware, or may be implemented by hardware executing corresponding software. The hardware or software includes one or more modules corresponding to the foregoing function.

According to a third aspect, a first network device is provided, including a processor and a memory. The memory is configured to store a computer executable instruction. When the first network device runs, the processor executes the computer executable instruction stored in the memory, to enable the first network device to perform the network slice selection method described in any one of the first aspect and the possible designs.

According to a fourth aspect, a first network device is provided, including a processor. The processor is configured to: after being coupled to a memory and reading an instruction in the memory, perform, according to the instruction, the network slice selection method described in any one of the first aspect and the possible designs.

According to a fifth aspect, a computer readable storage medium is provided. The computer readable storage medium stores an instruction. When the instruction is run on a computer, the computer is enabled to perform the network slice selection method described in any one of the first aspect and the possible designs.

According to a sixth aspect, a computer program product including an instruction is provided. When the instruction is run on a computer, the computer is enabled to perform the network slice selection method described in any one of the first aspect and the possible designs.

According to a seventh aspect, a chip system is provided. The chip system includes a processor, configured to support a first network device in implementing a function in the first aspect, for example, obtaining user characteristic information of a current user of a first terminal. In a possible design, the chip system further includes a memory. The memory is configured to store a program instruction and data that are necessary for the first network device. The chip system may include a chip, or may include a chip and another discrete component.

For technical effects of any design of the second aspect to the seventh aspect, refer to the technical effects of different designs of the first aspect, and details are not described herein again.

According to an eighth aspect, a network slice selection system is provided. The network slice selection system includes a first network device. The first network device is configured to perform the steps performed by the first network device in the first aspect or in the solution provided the embodiments of this application.

In a possible design, the network slice selection system may further include another device that interacts with the first network device in the solution provided in the embodiments of this application, for example, a database network element, an authentication server, or a slice selection function network element.

These aspects or other aspects of this application are more concise and understandable in the descriptions of the following embodiments.

DESCRIPTION OF EMBODIMENTS

Figure 1:
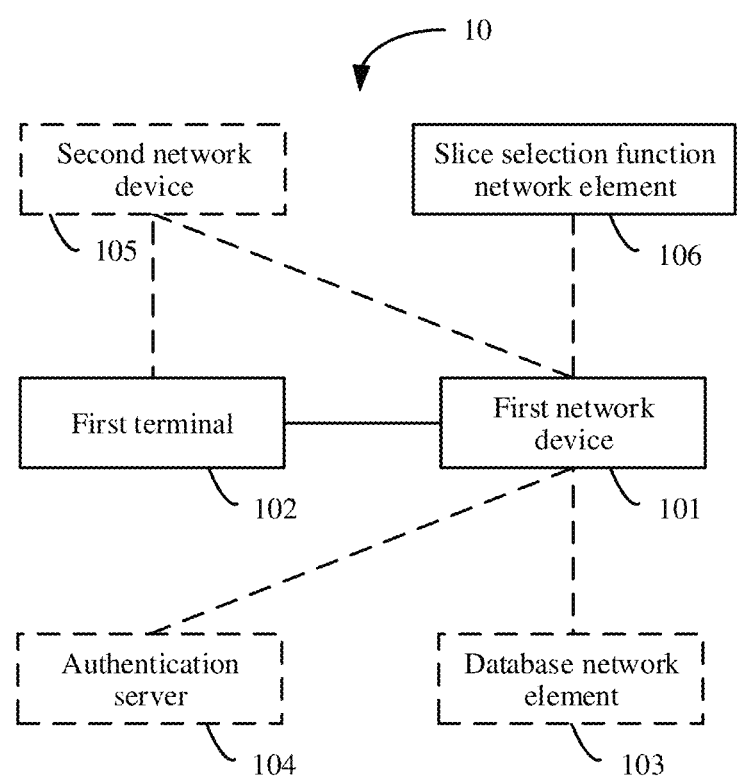
FIG. 1 is a schematic structural diagram of a network slice selection system according to an embodiment of this application.

For ease of understanding the solutions in the following embodiments of this application, related concepts are first briefly described as follows:

For single NSSAI (single NSSAI, S-NSSAI), NSSAI includes one or more pieces of S-NSSAI, and one piece of S-NSSAI is used to identify one particular type of network slice. The S-NSSAI includes a slice/service type (slice/service type, SST) and a slice differentiator (slice differentiator, SD). The SST includes a standard type and an operator-defined type. The SD is optional information supplementing the SST, to distinguish between a plurality of network slices of a same SST.

Requested NSSAI is NSSAI requested by a terminal, and includes one or more pieces of S-NSSAI.

Subscribed NSSAI is NSSAI to which a terminal subscribes, includes one or more pieces of S-NSSAI, and usually is stored in a subscription database of the terminal.

Allowed NSSAI is NSSAI that is provided by a serving network and that a terminal is allowed to use in a current registration area network, and includes one or more pieces of S-NSSAI.

The following describes the technical solutions in the embodiments of this application with reference to the accompanying drawings in the embodiments of this application. In the descriptions of this application, unless otherwise specified, the character "/" indicates an "or" relationship between associated objects. For example, A/B may represent A or B. The term "and/or" in this specification describes only an association relationship between associated objects and represents that three relationships may exist. For example, A and/or B may represent the following three cases: Only A exists, both A and B exist, and only B exists. A and B each may be in a singular form or a plural form. In addition, in the descriptions of this application, unless otherwise specified, "a plurality of" means two or more than two. "At least one of the following" or a similar expression means any combination of the items, including a single item or any combination of a plurality of items. For example, at least one of a, b, or c may represent a, b, c, a-b, a-c, b-c, or a-b-c, where a, b, c each may be in a singular form or a plural form. In addition, for ease of clearly describing the technical solutions in the embodiments of this application, in the embodiments of this application, words such as "first" and "second" are used to distinguish between same items or similar items that have basically the same functions and roles. A person skilled in the art may understand that the words such as "first" and "second" do not limit a quantity or an execution order, and the words such as "first" and "second" do not necessarily limit a difference.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

FIG. 1 shows a network slice selection system 10 according to an embodiment of this application. The network slice selection system 10 includes a first network device 101 and a first terminal 102.

The first network device 101 is configured to obtain user characteristic information of a current user of the first terminal 102, and determine, based on the user characteristic information, that the first terminal 102 is allowed to access a network slice indicated in one or more pieces of S-NSSAI corresponding to the current user of the first terminal, where the user characteristic information includes the one or more pieces of S-NSSAI.

The first network device 101 is further configured to determine, based on the one or more pieces of S-NSSAI, allowed NSSAI corresponding to the first terminal 102, and send the allowed NSSAI to the first terminal 102, where the allowed NSSAI includes the one or more pieces of S-NSSAI corresponding to the current user of the first terminal.

The first terminal 102 is configured to receive the allowed NSSAI corresponding to the first terminal 102 from the first network device 101, and access one or more network slices indicated in the allowed NSSAI.

In the network slice selection system provided in this embodiment of this application, the first network device can obtain the user characteristic information of the current user of the first terminal, where the user characteristic information includes the one or more pieces of S-NSSAI corresponding to the current user of the first terminal, and the first network device can determine, based on the user characteristic information, the allowed NSSAI corresponding to the first terminal, where the allowed NSSAI includes the one or more pieces of S-NSSAI. Therefore, based on the network slice selection system provided in this embodiment of this application, the corresponding network slice can be selected and accessed based on the user.

Optionally, in this embodiment of this application, that the first network device 101 is configured to obtain the user characteristic information of the current user of the first terminal 102 may be specifically: The first network device 101 is configured to send a first message to the first terminal 102, where the first message is used to request a user identifier of the current user of the first terminal 102; receive the user identifier from the first terminal; and obtain the user characteristic information of the current user of the first terminal based on the user identifier.

In a possible implementation, as shown in FIG. 1, the network slice selection system 10 provided in this embodiment of this application may further include a database network element 103. Correspondingly, that the first network device 101 is configured to obtain the user characteristic information of the current user of the first terminal based on the user identifier may be specifically: The first network device 101 is configured to send a second message to the database network element 103, where the second message carries the user identifier and is used to request the user characteristic information of the current user of the first terminal 102; and receive the user characteristic information of the current user from the database network element 103.

Alternatively, in another possible implementation, as shown in FIG. 1, the network slice selection system 10 provided in this embodiment of this application may further include an authentication server 104. Correspondingly, that the first network device 101 is configured to obtain the user characteristic information of the current user of the first terminal based on the user identifier may be specifically: The first network device 101 is configured to send a second message to the authentication server 104, where the second message carries the user identifier and is used to request the user characteristic information of the current user of the first terminal 102; and receive the user characteristic information of the current user from the authentication server 104.

Based on the foregoing solution, the first network device can obtain the user characteristic information of the current user of the first terminal.

Optionally, as shown in FIG. 1, the network slice selection system 10 provided in this embodiment of this application may further include a second network device 105. The first network device 101 is further configured to: when the first network device 101 does not support serving the network slice indicated in the one or more pieces of S-NSSAI corresponding to the current user of the first terminal, determine, based on the one or more pieces of S-NSSAI, the second network device 105 that supports serving the network slice indicated in the one or more pieces of S-NSSAI, to redirect to the second network device 105. For example, the first network device 101 may send a message related to the first terminal 102 to the second network device 105 based on information about the second network device 105. The second network device 105 is configured to receive the message related to the first terminal 102 from the first network device 101.

To be specific, based on this solution, after the first network device obtains the user characteristic information including the one or more pieces of S-NSSAI corresponding to the current user of the first terminal, if the first network device cannot serve the network slice indicated in the one or more pieces of S-NSSAI, that is, a function of the first network device is insufficient to provide a corresponding network capability such as a low latency or high reliability, network device reselection may be triggered, to redirect the message related to the first terminal to the second network device that can serve the network slice indicated in the one or more pieces of S-NSSAI.

Optionally, as shown in FIG. 1, the network slice selection system 10 provided in this embodiment of this application may further include a slice selection function network element 106.

In a possible implementation, that the first network device 101 is configured to determine, based on the one or more pieces of S-NSSAI, the second network device 105 that supports serving the network slice indicated in the one or more pieces of S-NSSAI is specifically: The first network device 101 is configured to send a fourth message to the slice selection function network element 106, where the fourth message carries the one or more pieces of S-NSSAI, and is used to request a network device that supports serving the network slice indicated in the one or more pieces of S-NSSAI; and receive the information about the second network device from the slice selection function network element 106.

Alternatively, in a possible implementation, that the first network device 101 is configured to determine, based on the one or more pieces of S-NSSAI, the second network device 105 that supports serving the network slice indicated in the one or more pieces of S-NSSAI is specifically: The first network device 101 is configured to send a fifth message to the slice selection function network element 106, where the fifth message carries the one or more pieces of S-NSSAI, and is used to request a network device that supports serving the network slice indicated in the one or more pieces of S-NSSAI; receive information about a candidate network device set from the slice selection function network element 106; and select the second network device from the candidate network device set based on the information about the candidate network device set.

Based on the foregoing solution, the first network device can determine the second network device that can serve the network slice indicated in the one or more pieces of S-NSSAI corresponding to the current user of the first terminal.

Optionally, in FIG. 1, the first terminal 102 may directly communicate with the first network device 101 or the second network device 105, or may communicate with the first network device 101 or the second network device 105 through forwarding by another device. This is not specifically limited in this embodiment of this application.

Optionally, in FIG. 1, the first network device 101 may directly communicate with the database network element 103, or may communicate with the database network element 103 through forwarding by another device. This is not specifically limited in this embodiment of this application.

Optionally, in FIG. 1, the first network device 101 may directly communicate with the authentication server 104, or may communicate with the authentication server 104 through forwarding by another device. This is not specifically limited in this embodiment of this application.

Optionally, in FIG. 1, the first network device 101 may directly communicate with the second network device 105, or may communicate with the second network device 105 through forwarding by another device. This is not specifically limited in this embodiment of this application.

Optionally, in FIG. 1, the first network device 101 may directly communicate with the network slice selection function network element 106, or may communicate with the network slice selection function network element 106 through forwarding by another device. This is not specifically limited in this embodiment of this application.

Optionally, the network slice selection system 10 in FIG. 1 may be used in a current 5G network and another future network. This is not specifically limited in this embodiment of this application.

Figure 2:
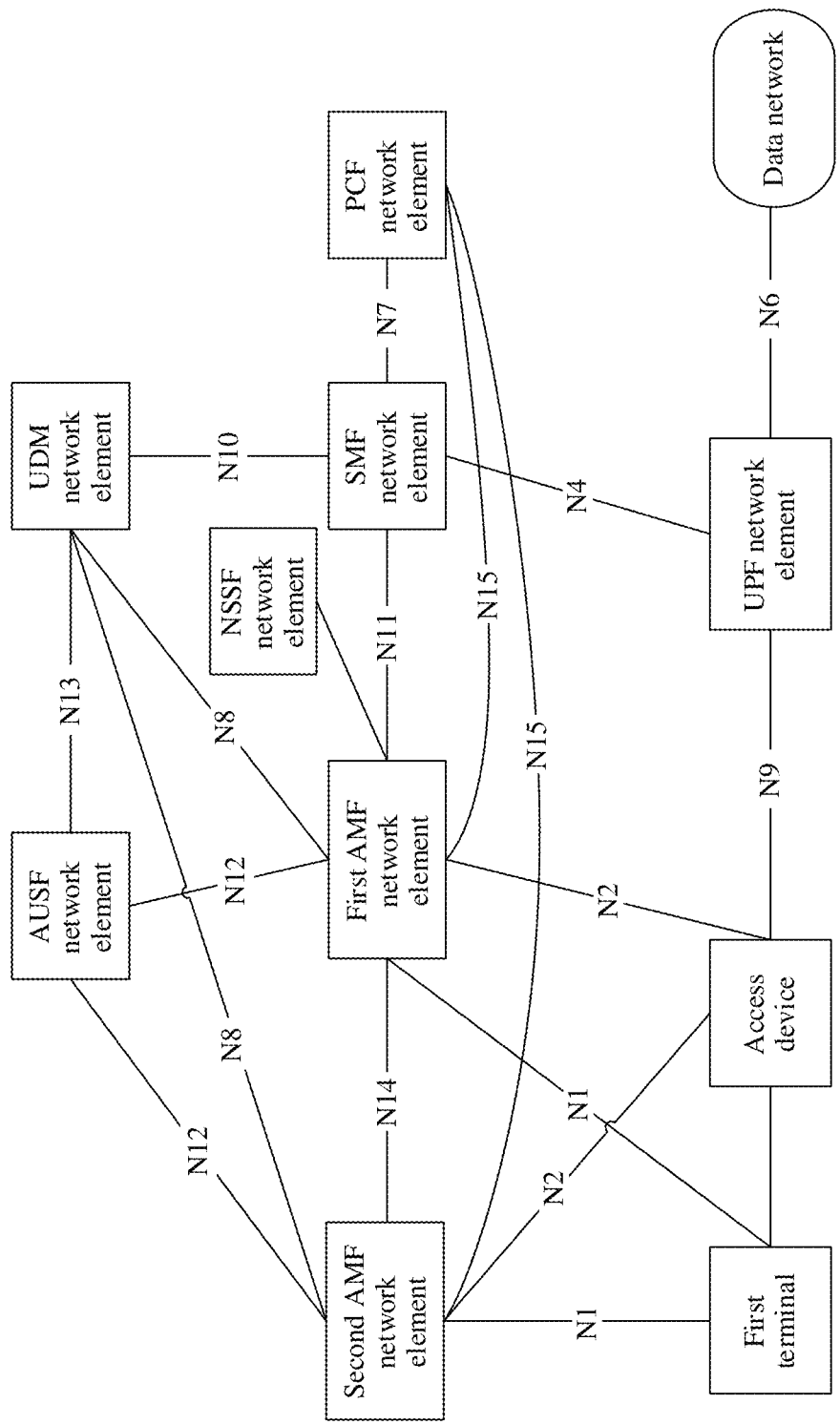
FIG. 2 is a schematic diagram of a network slice selection system applying in a 5G network according to an embodiment of this application.

For example, assuming that the network slice selection system 10 in FIG. 1 is used in the current 5G network, as shown in FIG. 2, a network element or an entity corresponding to the first network device 101 may be a first access and mobility management function (access and mobility management function, AMF) network element in the 5G network, a network element or an entity corresponding to the first terminal 102 may be a first terminal in the 5G network, a network element or an entity corresponding to the database network element 103 may be a unified data management (unified data management, UDM) network element in the 5G network, a network element or an entity corresponding to the second network device 105 may be a second AMF network element in the 5G network, and a network element or an entity corresponding to the network slice selection function network element 106 may be a network slice selection function (network slice selection function, NSSF) network element in the 5G network. In addition, although not shown, a network element or an entity corresponding to the authentication server 104 may be a third-party authentication, authorization, and accounting (authentication-authorization-accounting) server. This is not specifically limited in this embodiment of this application.

In addition, as shown in FIG. 2, the 5G network may further include an access device, an authentication server function (authentication server function, AUSF) network element, a policy control function (policy control function, PCF) network element, a user plane function (user plane function, UPF) network element, or the like. This is not specifically limited in this embodiment of this application.

The first terminal accesses a network by using the access device, and the first terminal communicates with the first AMF network element or the second AMF network element by using a next generation network (next generation, N) interface 1 (N1 for short). The access device communicates with the first AMF network element or the second AMF network element by using an N2 interface (N2 for short), and communicates with the UPF network element by using an N3 interface (N3 for short). The first AMF network element communicates with the second AMF network element by using an N14 interface (N14 for short). The first AMF network element or the second AMF network element communicates with the SMF network element by using an N11 interface (N11 for short). The first AMF network element or the second AMF network element communicates with the AUSF network element by using an N12 interface (N12 for short). The first AMF network element or the second AMF network element communicates with the UDM network element by using an N8 interface (N8 for short). The first AMF network element or the second AMF network element communicates with the PCF network element by using an N15 interface (N15 for short). The AUSF network element communicates with the UDM network element by using an N13 interface (N13 for short). The SMF network element communicates with the UDM network element by using an N10 interface (N10 for short). The SMF network element communicates with the PCF network element by using an N7 interface (N7 for short). The SMF network element communicates with the UPF network element by using an N4 interface (N4 for short). The UPF network element accesses a data network by using an N6 interface (N6 for short). In addition, the first AMF network element may further communicate with the NSSF network element.

It should be noted that names of interfaces between network elements in FIG. 2 are merely examples. During specific implementation, the interfaces may have other names. This is not specifically limited in this embodiment of this application.

It should be noted that the first terminal, the access device, the first AMF network element, the second AMF network element, the SMF network element, the UPF network element, the AUSF network element, the UDM network element, the PCF network element, the UPF network element, or the like in FIG. 2 is merely a name, and the name constitute no limitation on the device. In the 5G network and another future network, a network element or an entity corresponding to the first terminal, the access device, the first AMF network element, the second AMF network element, the SMF network element, the UPF network element, the AUSF network element, the UDM network element, the PCF network element, the UPF network element, or the like may have another name. This is not specifically limited in this embodiment of this application. For example, the UPF network element may be alternatively replaced with a UPF, a UPF entity, or the like. Description is provided herein together. Details are not described below.

In addition, it should be noted that in the 5G network in FIG. 2, a control plane network element such as the AMF network element (including the first AMF network element or the second AMF network element), the SMF network element, the AUSF network element, the UDM network element, or the PCF network element may interact by using a service based interface. For example, a service based interface provided by the AMF network element may be Namf, a service based interface provided by the SMF network element may be Nsmf, a service based interface provided by the AUSF network element may be Nausf, a service based interface provided by the UDM network element may be Nudm, and a service based interface provided by the PCF network element may be Npcf. For related descriptions, refer to a 5G system architecture (5G system architecture) diagram in the 23501 standard, and details are not described herein.

Optionally, a terminal (terminal) (including the first terminal and any other terminal in the embodiments of this application) in this embodiment of this application is an entry for interaction between a mobile user and a network, and can provide a basic computing capability and storage capability, display a service window to a user, receive a user operation input, and the like. In addition, the terminal may further establish a signal connection and a data connection to an access device, to transmit a control signal and service data to a mobile network. For example, the terminal may include various handheld devices, vehicle-mounted devices, wearable devices, computing devices, or other processing devices connected to a wireless modem that have a wireless communication function, and may further include a subscriber unit (subscriber unit), a cellular phone (cellular phone), a smartphone (smartphone), a wireless data card, a personal digital assistant (personal digital assistant, PDA) computer, a tablet computer, a wireless modem (modem), a handheld device (handheld), a laptop computer (laptop computer), a cordless phone (cordless phone) or a wireless local loop (wireless local loop, WLL) station, a machine type communication (machine type communication, MTC) terminal, user equipment (user equipment, UE), a mobile station (mobile station, MS), a terminal device (terminal device), relay user equipment, or the like. The relay user equipment may be, for example, a 5G residential gateway (residential gateway, RG). For ease of description, the devices mentioned above are collectively referred to as a terminal in this application. The terminal may be uniquely determined by a terminal identifier. The terminal identifier may be, for example, an international mobile subscriber identity (international mobile subscriber identifier, IMSI). This is not specifically limited in this embodiment of this application.

Optionally, a current user (end-user) (which may be briefly referred to as user below) of the terminal in this embodiment of this application may be considered as an entity (entity) that uses a 3GPP system service. For example, the user may be a user of a mobile phone, and the mobile phone accesses a 3GPP system, for example, accesses an access device in the 5G network. Alternatively, the user is a non-3GPP device that is connected to a 3GPP system by using a gateway. Alternatively, the user may be an application or the like that is run on a terminal. This is not specifically limited in this embodiment of this application. One user may have one or more user identities (user identities), for example, a user identity in an occupational background of the user, or a private user identity in some aspects of a private life. This is not specifically limited in this embodiment of this application. The user identifier (user identifier) in this embodiment of this application usually is used to identify a particular user identity in one or more systems. The user characteristic information in this embodiment of this application may be alternatively referred to as a user identity profile (user identity profile), and is a set of information associated with the user identity. Description is provided herein together, and details are not described below.

Optionally, the access device in this embodiment of this application is a device for accessing a core network, and is similar to a base station in a conventional network. The access device is deployed at a location close to a terminal, provides a network access function for an authorized user in a particular area, and can transmit user data by using transmission tunnels of different quality based on a user grade, a service requirement, and the like. In addition, the access device can further manage a resource of the access device, properly use the resource, provide an access service for the terminal as required, and forward a control signal and user data between the terminal and the core network. For example, the access device may be a base station, a broadband network gateway (broadband network gateway, BNG), an aggregation switch, or a non-3rd generation partnership project (3rd generation partnership project, 3GPP) access device. The base station may include base stations in various forms, for example, a macro base station, a micro base station (which is also referred to as a small cell), a relay station, an access point, and the like.

Optionally, the first network device in FIG. 1 in this embodiment of this application may be implemented by one device, or may be implemented by a plurality of devices together, or may be a function module in one device. This is not specifically limited in this embodiment of this application. It may be understood that the foregoing function may be a network element in a hardware device, a software function that is run on dedicated hardware, or a virtualized function that is instantiated on a platform (for example, a cloud platform).

Figure 3:
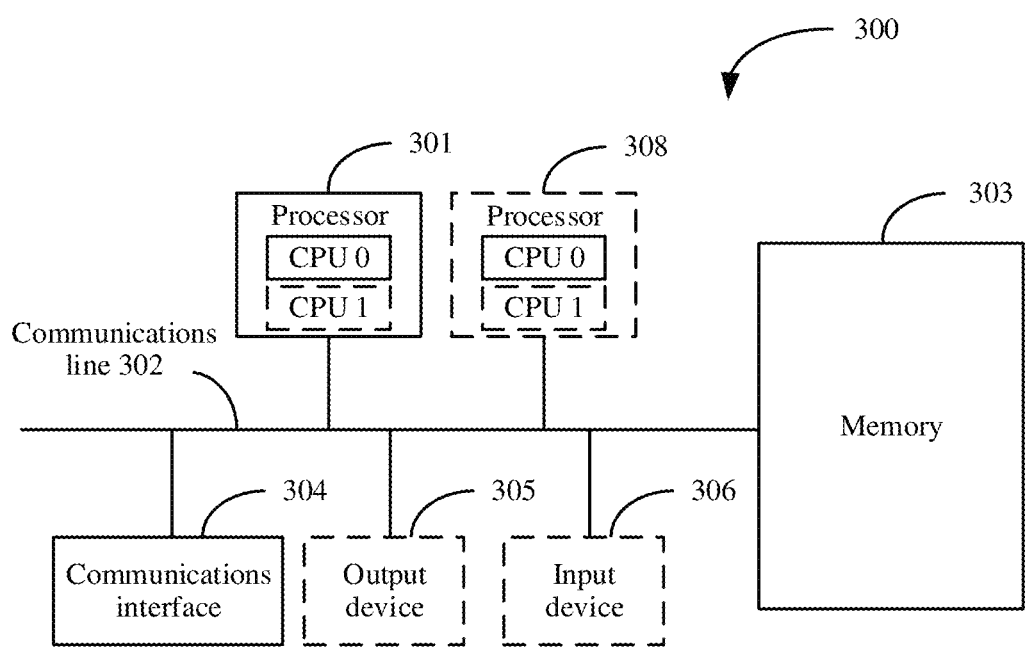
FIG. 3 is a schematic diagram of a hardware structure of a communications device according to an embodiment of this application.

For example, the first network device in FIG. 1 in this embodiment of this application may be implemented by using a communications device 300 in FIG. 3. FIG. 3 is a schematic hardware structural diagram of the communications device according to an embodiment of this application. The communications device 300 includes a processor 301, a line of communications 302, and one or more communications interfaces 304. Optionally, as shown in FIG. 3, the communications device 300 may further include a memory 303.

The processor 301 may be a general central processing unit (central processing unit, CPU), a micro-processor, an application-specific integrated circuit (application-specific integrated circuit, ASIC), or one or more integrated circuits configured to control execution of a program of the solutions of this application.

The line of communications 302 may include a channel for transmitting information between the components.

The communications interface 304 uses any apparatus such as a transceiver, and is configured to communicate with another device or communications network, for example, an Ethernet, a radio access network (radio access network, RAN), or a wireless local area network (wireless local area networks, WLAN).

The memory 303 may be, but not limited to, a read-only memory (read-only memory, ROM) or another type of static storage device capable of storing static information and an instruction, or a random access memory (random access memory, RAM) or another type of dynamic storage device capable of storing information and an instruction, or may be an electrically erasable programmable read-only memory (electrically erasable programmable read-only memory, EEPROM), a compact disc read-only memory (compact disc read-only memory, CD-ROM) or other compact disc storage, optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer. The memory 303 may exist independently, or may be connected to the processor 301 by using the line of communications 302. The memory 303 may be alternatively integrated with the processor 301.

The memory 303 is configured to store a computer executable instruction of performing the solutions of this application, and the processor 301 controls execution. The processor 301 is configured to execute the computer executable instruction stored in the memory 303, to implement the network slice selection method provided in the following embodiments of this application.

Optionally, the computer executable instruction in this embodiment of this application may be alternatively referred to as application program code. This is not specifically limited in this embodiment of this application.

During specific implementation, in an embodiment, the processor 301 may include one or more CPUs, for example, CPU 0 and CPU 1 in FIG. 3.

During specific implementation, in an embodiment, the communications device 300 may include a plurality of processors, for example, a processor 301 and a processor 308 in FIG. 3. Each of the processors may be a single-core (single-CPU) processor, or may be a multi-core (multi-CPU) processor. The processors may be one or more devices, circuits, and/or processing cores used to process data (for example, a computer program instruction).

During specific implementation, in an embodiment, the communications device 300 may further include an output device 305 and an input device 306. The output device 305 communicates with the processor 301, and may display information in a plurality of manners. For example, the output device 305 may be a liquid crystal display (liquid crystal display, LCD), a light emitting diode (light emitting diode, LED) display device, a cathode ray tube (cathode ray tube, CRT) display device, or a projector. The input device 306 communicates with the processor 301, and may receive an input of the user in a plurality of manners. For example, the input device 306 may be a mouse, a keyboard, a touchscreen device, or a sensor device.

The communications device 300 may be a general-purpose device or a dedicated device. During specific implementation, the communications device 300 may be a desktop computer, a portable computer, a network server, a palmtop computer (personal digital assistant, PDA), a mobile phone, a tablet computer, a wireless terminal device, an embedded device, or a device having a structure similar to that in FIG. 3. A type of the communications device 300 is not limited in this embodiment of this application.

The following specifically describes, with reference to FIG. 1 to FIG. 3, a network slice selection method provided in the embodiments of this application.

It should be noted that a name of a message between network elements, a name of a parameter in the message, or the like in the following embodiments of this application is merely an example, and may be alternatively another name during specific implementation. This is not specifically limited in the embodiments of this application.

Figure 4:
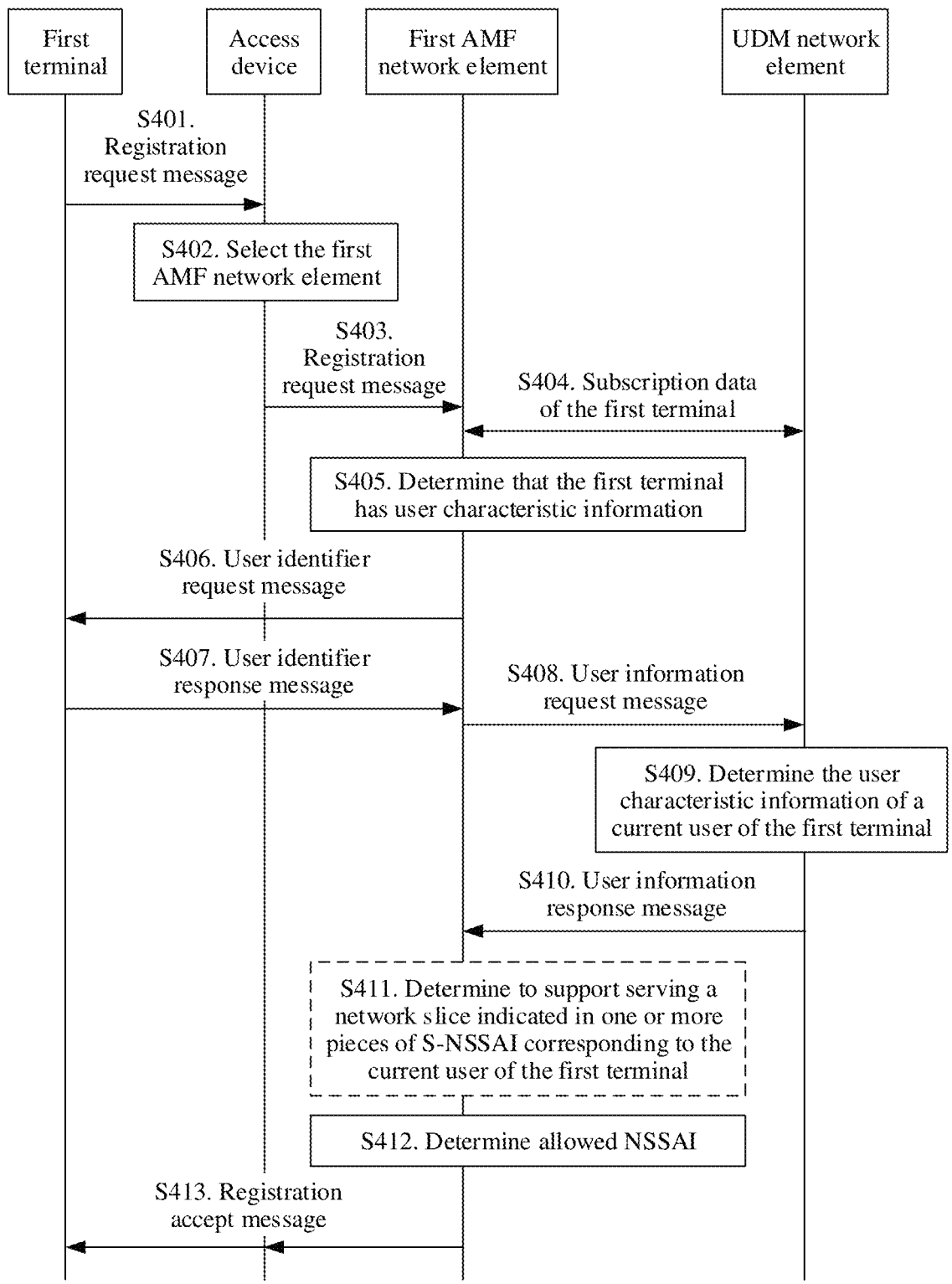
FIG. 4 is a schematic flowchart 1 of a network slice selection method according to an embodiment of this application.

First, an example in which the network slice selection system in FIG. 1 is used in the 5G network in FIG. 2 and the first network device is a first AMF network element is used. FIG. 4 shows a network slice selection method according to an embodiment of this application. The network slice selection method includes the following steps (it may be understood that there are one or more terminals in the network, and only a first terminal is used as an example for description below):

S401. The first terminal sends a message 1 to an access device, so that the access device receives the message 1 from the first terminal.

The message 1 carries first indication information, and the first indication information is used to indicate that the first terminal has user characteristic information.

In a possible implementation, the message 1 includes requested NSSAI of the first terminal, and the first indication information is tag information in S-NSSAI included in the requested NSSAI of the first terminal. To be specific, the requested NSSAI of the first terminal includes the S-NSSAI including the tag information, and the tag information is used to indicate that the first terminal has the user characteristic information.

Alternatively, in a possible implementation, the first indication information may be represented by using a user characteristic requirement (user characteristic requirement) cell in the message 1. This is not specifically limited in this embodiment of this application.

For example, as shown in FIG. 4, the message 1 in this embodiment of this application may be a registration request (registration request) message. This is not specifically limited in this embodiment of this application.

S402. The access device selects the first AMF network element to serve the first terminal.

For a specific implementation of step S402, refer to an existing implementation. Details are not described herein.

S403. The access device forwards the received message 1 to the first AMF network element, so that the first AMF network element receives the message 1 from the access device.

S404. The first AMF network element obtains subscription data of the first terminal from a UDM network element.

For a specific implementation of step S404, refer to an existing implementation. Details are not described herein.

S405. The first AMF network element determines, based on the first indication information in the message 1, that the first terminal has the user characteristic information.

In step S401 to step S405, description is provided only by using an example in which the first AMF network element determines, based on the first indication information carried in the message 1, that the first terminal has the user characteristic information. In this embodiment of this application, the first AMF network element may alternatively determine, in another manner, that the first terminal has the user characteristic information. For example, the subscription data of the first terminal obtained by the first AMF network element in step S404 includes second indication information, and the second indication information is used to indicate that the first terminal has the user characteristic information. Then, the first AMF network element can determine, based on the second indication information, that the first terminal has the user characteristic information. Optionally, the subscription data of the first terminal may include subscribed NSSAI of the first terminal, and the second indication information may be tag information in S-NSSAI included in the subscribed NSSAI of the first terminal. To be specific, the subscribed NSSAI of the first terminal includes the S-NSSAI including the tag information, and the tag information is used to indicate that the first terminal has the user characteristic information. This is not specifically limited in this embodiment of this application.

S406. The first AMF network element sends a message 2 to the first terminal, so that the first terminal receives the message 2 from the first AMF network element.

The message 2 is used to request a user identifier of the current user of the first terminal.

It should be noted that the current user in this embodiment of this application may be alternatively described as a current login user. This is not specifically limited in this embodiment of this application.

For example, as shown in FIG. 4, the message 2 in this embodiment of this application may be a user identifier request (user identifier request) message. This is not specifically limited in this embodiment of this application.

S407. The first terminal sends a message 3 to the first AMF network element, so that the first AMF network element receives the message 3 from the first terminal.

The message 3 carries the user identifier of the current user of the first terminal.

For example, as shown in FIG. 4, the message 3 in this embodiment of this application may be a user identifier response (user identifier response) message. This is not specifically limited in this embodiment of this application.

S408. The first AMF network element sends a message 4 to the UDM network element, so that the UDM network element receives the message 4 from the first AMF network element.

The message 4 carries the user identifier of the current user of the first terminal, and is used to request the user characteristic information of the current user of the first terminal.

Optionally, in this embodiment of this application, if the first indication information is the tag information in the S-NSSAI included in the requested NSSAI of the first terminal, the message 4 may further carry the S-NSSAI that includes the tag information and that is in the message 1. This is not specifically limited in this embodiment of this application.

For example, as shown in FIG. 4, the message 4 in this embodiment of this application may be a user information request (user info request) message. This is not specifically limited in this embodiment of this application.

S409. The UDM network element determines the user characteristic information of the current user of the first terminal, where the user characteristic information includes one or more pieces of S-NSSAI corresponding to the current user of the first terminal.

Optionally, in a possible implementation, after receiving the message 4 from the first AMF network element, the UDM network element may search for a locally stored corresponding user account (user account) based on the user identifier of the current user of the first terminal carried in the message 4, where the user account stores the user characteristic information of the current user of the first terminal, for example, includes the one or more pieces of S-NSSAI corresponding to the current user of the first terminal.

Optionally, in another possible implementation, if the message 4 may further carry the S-NSSAI that includes the tag information and that is in the message 1, after receiving the message 4 from the first AMF network element, the UDM network element may determine, based on the user identifier of the current user of the first terminal and the S-NSSAI including the tag information that are carried in the message 4, the user characteristic information of the current user that is of the first terminal and that corresponds to the S-NSSAI including the tag information. For example, the UDM network element searches for a locally stored corresponding user account (user account) based on the user identifier of the current user of the first terminal, where the user account stores a correspondence between the S-NSSAI including the tag information and the user characteristic information of the current user of the first terminal. Then, the UDM network element can determine, based on the correspondence and the S-NSSAI that includes the tag information, the user characteristic information of the current user that is of the first terminal and that corresponds to the S-NSSAI including the tag information. This is not specifically limited in this embodiment of this application.

S410. The UDM network element sends a message 5 to the first AMF network element, so that the first AMF network element receives the message 5 from the UDM network element, where the message 5 carries the user characteristic information of the current user of the first terminal.

For example, as shown in FIG. 4, the message 5 in this embodiment of this application may be a user information response (user info response) message. This is not specifically limited in this embodiment of this application.

Optionally, in this embodiment of this application, the first AMF network element may alternatively obtain the user characteristic information of the current user of the first terminal from a new network element such as a user account database with reference to the foregoing manner in step S408 to step S411. This is not specifically limited in this embodiment of this application.

In this embodiment of this application, the one or more pieces of S-NSSAI that correspond to the current user of the first terminal and that are included in the user characteristic information are used to indicate one or more network slices that the current user of the first terminal is allowed to access. In this way, the first AMF network element subsequently determines, based on the one or more pieces of S-NSSAI corresponding to the current user of the first terminal, allowed NSSAI corresponding to the first terminal, where the allowed NSSAI includes the one or more pieces of S-NSSAI corresponding to the current user of the first terminal. After the allowed NSSAI of the first terminal is sent to the first terminal, a network slice that is selected and accessed by the first terminal based on the allowed NSSAI may be a network slice in the one or more network slices that the current user of the first terminal is allowed to access. In other words, the corresponding network slice can be selected and accessed based on the user.

S411. The first AMF network element determines that the first AMF network element supports serving a network slice indicated in the one or more pieces of S-NSSAI corresponding to the current user of the first terminal.

Optionally, in a possible implementation, a list of S-NSSAI that can be supported by the first AMF network element may be preconfigured on the first AMF network element. If all of the one or more pieces of S-NSSAI corresponding to the current user of the first terminal are in the list, the first AMF network element can determine that the first AMF network element supports serving the network slice indicated in the one or more pieces of S-NSSAI corresponding to the current user of the first terminal.

It should be noted that in this embodiment of this application, step S411 is an optional step, and step S411 may not be performed. Description is provided herein together, and details are not described below.

S412. The first AMF network element determines, based on the one or more pieces of S-NSSAI corresponding to the current user of the first terminal, the allowed NSSAI corresponding to the first terminal, where the allowed NSSAI includes the one or more pieces of S-NSSAI corresponding to the current user of the first terminal.

Optionally, in a possible implementation, that the first AMF network element determines, based on the one or more pieces of S-NSSAI corresponding to the current user of the first terminal, the allowed NSSAI corresponding to the first terminal may specifically include: The first AMF network element replaces, with the one or more pieces of S-NSSAI corresponding to the current user of the first terminal, the S-NSSAI that is in the requested NSSAI of the first terminal and that includes the tag information, or replaces, with the one or more pieces of S-NSSAI corresponding to the current user of the first terminal, the S-NSSAI that is in the subscribed NSSAI of the first terminal and that includes the tag information. To be specific, the allowed NSSAI corresponding to the first terminal includes the requested NSSAI (excluding the S-NSSAI including the tag information) of the first terminal or the subscribed NSSAI (excluding the S-NSSAI including the tag information) of the first terminal, and the one or more pieces of S-NSSAI corresponding to the current user of the first terminal.

For example, it is assumed that the requested NSSAI of the first terminal or the subscribed NSSAI of the first terminal includes three pieces of S-NSSAI, for example, S-NSSAI 1, S-NSSAI 2, and S-NSSAI 3, where S-NSSAI 1 includes the tag information. In addition, the first AMF network element learns, by using the foregoing network slice selection method, that the one or more pieces of S-NSSAI corresponding to the current user of the first terminal are S-NSSAI 4, but the first AMF network element can determine that allowed NSSAI corresponding to the first terminal is S-NSSAI 4, S-NSSAI 2, and S-NSSAI 3. S-NSSAI 1 is replaced with S-NSSAI 4.

Optionally, in a possible implementation, that the first AMF network element determines, based on the one or more pieces of S-NSSAI corresponding to the current user of the first terminal, the allowed NSSAI corresponding to the first terminal may specifically include: The first AMF network element adds the one or more pieces of S-NSSAI corresponding to the current user of the first terminal to the requested NSSAI of the first terminal or the subscribed NSSAI of the first terminal. To be specific, the allowed NSSAI corresponding to the first terminal includes the requested NSSAI of the first terminal or the subscribed NSSAI of the first terminal, and the one or more pieces of S-NSSAI corresponding to the current user of the first terminal.

For example, it is assumed that the requested NSSAI of the first terminal or the subscribed NSSAI of the first terminal includes three pieces of S-NSSAI, for example, S-NSSAI 1, S-NSSAI 2, and S-NSSAI 3, where S-NSSAI 1 includes the tag information. In addition, the first AMF network element learns, by using the foregoing network slice selection method, that the one or more pieces of S-NSSAI corresponding to the current user of the first terminal are S-NSSAI 4. Then, the first AMF network element can determine that allowed NSSAI corresponding to the first terminal is S-NSSAI 1, S-NSSAI 2, S-NSSAI 3, and S-NSSAI 4.

S413. The first AMF network element sends a message 6 to the first terminal by using the access device, so that the first terminal receives the message 6 from the first AMF network element, where the message 6 carries the allowed NSSAI corresponding to the first terminal.

Optionally, in this embodiment of this application, if the allowed NSSAI corresponding to the first terminal is different from the requested NSSAI of the first terminal, the first AMF network element further needs to send a mapping (mapping) relationship between the allowed NSSAI and the requested NSSAI to the first terminal. For details, refer to an existing implementation. Details are not described herein.

For example, as shown in FIG. 4, the message 6 in this embodiment of this application may be a registration response (registration response) message. This is not specifically limited in this embodiment of this application.

After obtaining the allowed NSSAI corresponding to the first terminal, the first terminal can access one or more network slices indicated in the allowed NSSAI corresponding to the first terminal. For details, refer to an existing implementation. Details are not described herein.

In the network slice selection method provided in this embodiment of this application, the first AMF network element can obtain the user characteristic information of the current user of the first terminal, where the user characteristic information includes the one or more pieces of S-NSSAI corresponding to the current user of the first terminal, and the first AMF network element can determine, based on the user characteristic information, the allowed NSSAI corresponding to the first terminal, where the allowed NSSAI includes the one or more pieces of S-NSSAI. Therefore, based on the network slice selection method provided in this embodiment of this application, the corresponding network slice can be selected and accessed based on the user.

The actions of the first AMF network element in the foregoing steps S401 to S413 may be performed by the processor 301 in the communications device 300 in FIG. 3 by invoking the application program code stored in the memory 303. This is not limited in this embodiment.

Figure 5:
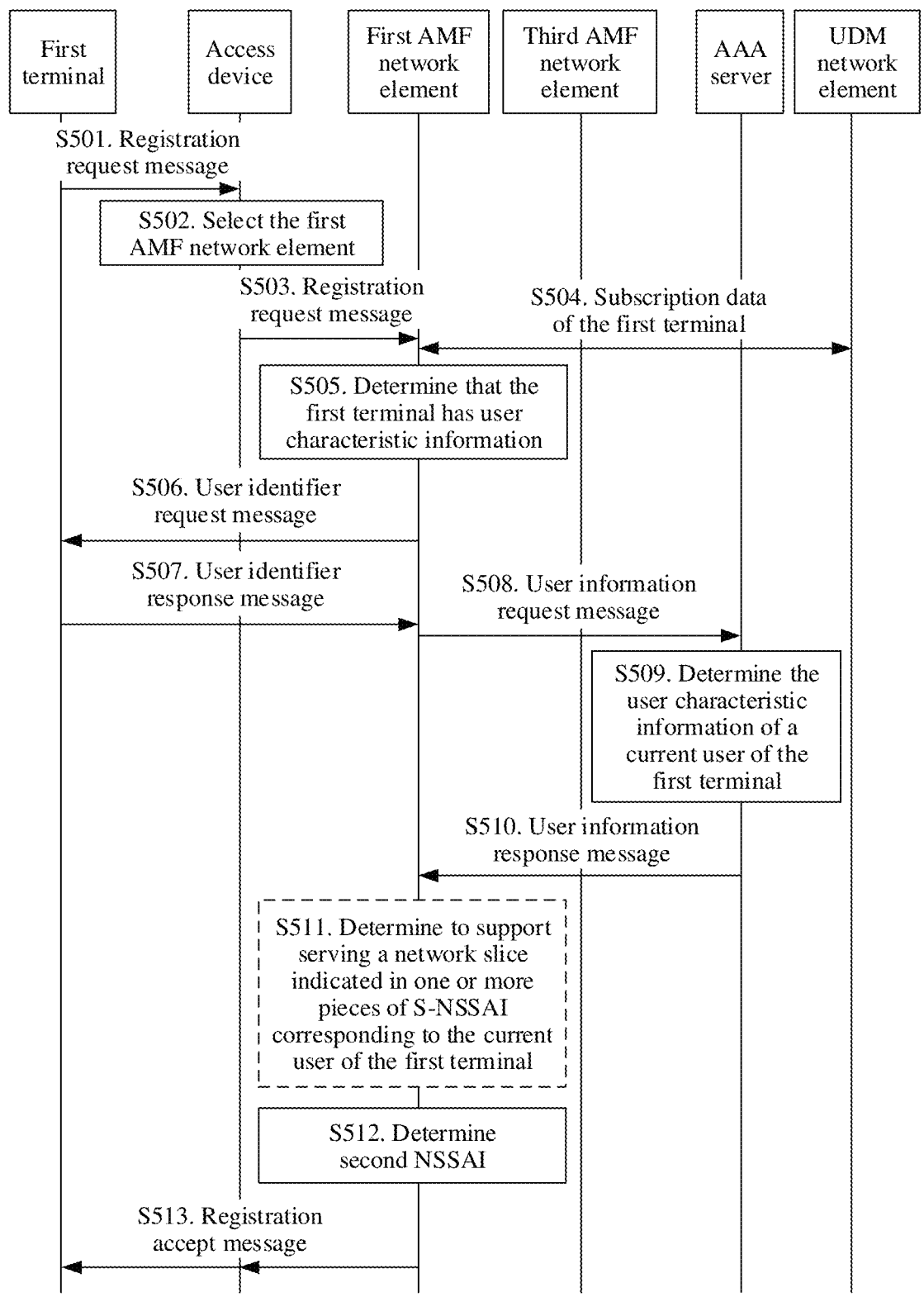
FIG. 5 is a schematic flowchart 2 of a network slice selection method according to an embodiment of this application.

Optionally, an example in which the network slice selection system in FIG. 1 is used in the 5G network in FIG. 2 and the first network device is a first AMF network element is used. FIG. 5 shows a network slice selection method according to an embodiment of this application. The network slice selection method includes the following steps (it may be understood that there are one or more terminals in the network, and only a first terminal is used as an example for description below):

S501 to S507 are the same as step S401 to step S407. For related descriptions, refer to the embodiment in FIG. 4. Details are not described herein again.

S508. The first AMF network element sends a message 7 to an AAA server, so that the AAA server receives the message 7 from the first AMF network element.

The message 7 carries the user identifier of the current user of the first terminal, and is used to request the user characteristic information of the current user of the first terminal.

Optionally, in this embodiment of this application, if the first indication information is the tag information in the S-NSSAI included in the requested NSSAI of the first terminal, the message 7 may further carry the S-NSSAI that includes the tag information and that is in the message 1. This is not specifically limited in this embodiment of this application.

Optionally, the message 7 may further request the AAA server to verify the user identifier of the current user of the first terminal. This is not specifically limited in this embodiment of this application.

For example, as shown in FIG. 5, the message 7 in this embodiment of this application may be a user information request (user info request) message. This is not specifically limited in this embodiment of this application.

S509. The AAA server determines the user characteristic information of the current user of the first terminal, where the user characteristic information includes one or more pieces of S-NSSAI corresponding to the current user of the first terminal.

Optionally, in a possible implementation, after receiving the message 7 from the first AMF network element, the AAA server may search for a locally stored corresponding user account (user account) based on the user identifier of the current user of the first terminal carried in the message 7, where the user account stores the user characteristic information of the current user of the first terminal, for example, includes the one or more pieces of S-NSSAI corresponding to the current user of the first terminal.

Optionally, in another possible implementation, if the message 7 may further carry the S-NSSAI that includes the tag information and that is in the message 1, after receiving the message 7 from the first AMF network element, the AAA server can determine, based on the user identifier of the current user of the first terminal and the S-NSSAI including the tag information that are carried in the message 7, the user characteristic information of the current user that is of the first terminal and that corresponds to the S-NSSAI including the tag information. For example, the AAA server searches for a locally stored corresponding user account (user account) based on the user identifier of the current user of the first terminal, where the user account stores a correspondence between the S-NSSAI including the tag information and the user characteristic information of the current user of the first terminal. Then, the AAA server can determine, based on the correspondence and the S-NSSAI that includes the tag information, the user characteristic information of the current user that is of the first terminal and that corresponds to the S-NSSAI including the tag information. This is not specifically limited in this embodiment of this application.

S510. The AAA server sends a message 8 to the first AMF network element, so that the first AMF network element receives the message 8 from the AAA server, where the message 8 carries the user characteristic information of the current user of the first terminal.

Optionally, in this embodiment of this application, the AAA server may further verify the user identifier of the current user of the first terminal, and add a verification result to the message 8. This is not specifically limited in this embodiment of this application.

For example, as shown in FIG. 5, the message 8 in this embodiment of this application may be a user information response (user info response) message. This is not specifically limited in this embodiment of this application.

S511 to S513 are the same as step S411 to step S413. For related descriptions, refer to the embodiment in FIG. 4. Details are not described herein again.

In the network slice selection method provided in this embodiment of this application, the first AMF network element can obtain the user characteristic information of the current user of the first terminal, where the user characteristic information includes the one or more pieces of S-NSSAI corresponding to the current user of the first terminal, and the first AMF network element can determine, based on the user characteristic information, the allowed NSSAI corresponding to the first terminal, where the allowed NSSAI includes the one or more pieces of S-NSSAI. Therefore, based on the network slice selection method provided in this embodiment of this application, the corresponding network slice can be selected and accessed based on the user.

The actions of the first AMF network element in the foregoing steps S501 to S513 may be performed by the processor 301 in the communications device 300 in FIG. 3 by invoking the application program code stored in the memory 303. This is not limited in this embodiment.

Figure 6:
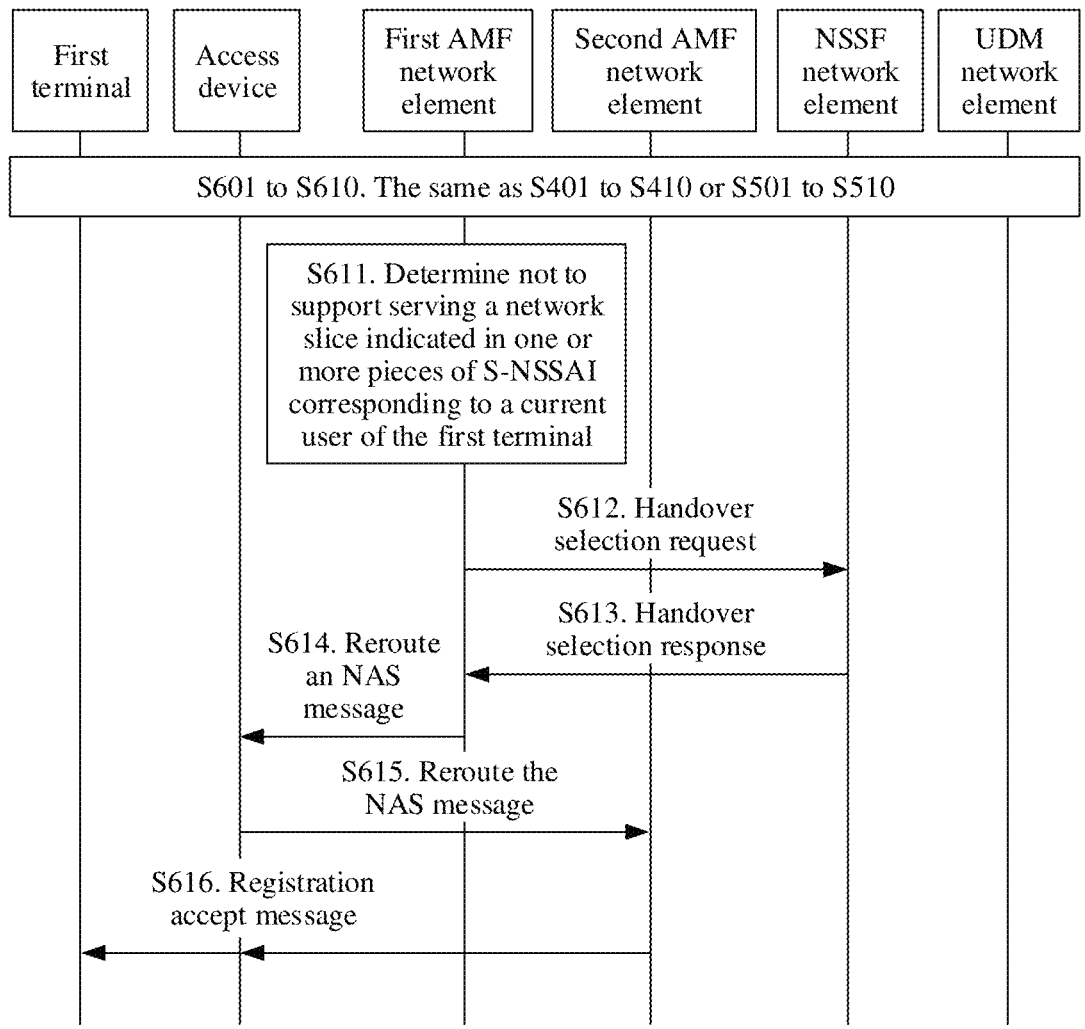
FIG. 6 is a schematic flowchart 3 of a network slice selection method according to an embodiment of this application.

Optionally, based on the network slice selection method in FIG. 4 or FIG. 5, after the first AMF network element obtains the user characteristic information including the one or more pieces of S-NSSAI corresponding to the current user of the first terminal, if the first AMF network element cannot serve the network slice indicated in the one or more pieces of S-NSSAI, that is, a function of the first AMF network element is insufficient to provide a corresponding network capability such as a low latency or high reliability, AMF network element reselection may be triggered, to redirect a message related to the first terminal to a second AMF network element that can serve the network slice indicated in the one or more pieces of S-NSSAI. Specifically, FIG. 6 shows another network slice selection method according to an embodiment of this application. The network slice selection method includes the following steps (it may be understood that there are one or more terminals in the network, and only a first terminal is used as an example for description below):

S601 to S610 are the same as step S401 to step S410 or step S501 to step S510. For related descriptions, refer to the embodiment in FIG. 4 or FIG. 5. Details are not described herein again.

S611. The first AMF network element determines that the first AMF network element does not support serving a network slice indicated in the one or more pieces of S-NSSAI corresponding to the current user of the first terminal.

Optionally, in a possible implementation, a list of S-NSSAI that can be supported by the first AMF network element may be preconfigured on the first AMF network element. If none of the one or more pieces of S-NSSAI corresponding to the current user of the first terminal is in the list, the first AMF network element can determine that the first AMF network element does not support serving the network slice indicated in the one or more pieces of S-NSSAI corresponding to the current user of the first terminal.

S612. The first AMF network element sends a message 9 to an NSSF network element, so that the NSSF network element receives the message 9 from the first AMF network element, where the message 9 carries the one or more pieces of S-NSSAI corresponding to the current user of the first terminal, and is used to request information about an AMF network element that supports serving the network slice indicated in the one or more pieces of S-NSSAI.

Optionally, in a possible implementation, the first AMF network element may replace, with the one or more pieces of S-NSSAI corresponding to the current user of the first terminal, the S-NSSAI that includes the tag information and that is in the requested NSSAI of the first terminal. To be specific, the message 9 sent by the first AMF network element to the NSSF network element may carry the requested NSSAI (excluding the S-NSSAI that includes the tag information) of the first terminal, the subscribed NSSAI of the first terminal, and the one or more pieces of S-NSSAI corresponding to the current user of the first terminal.

For example, it is assumed that the requested NSSAI of the first terminal includes three pieces of S-NSSAI, for example, S-NSSAI 1, S-NSSAI 2, and S-NSSAI 3, where S-NSSAI 1 includes the tag information. In addition, the first AMF network element learns, by using the foregoing network slice selection method, that the one or more pieces of S-NSSAI corresponding to the current user of the first terminal are S-NSSAI 4, but the first AMF network element cannot serve a network slice indicated in the S-NSSAI 4. In this case, the message 9 sent by the first AMF network element to the NSSF network element includes the requested NSSAI of the first terminal, for example, S-NSSAI 2 and S-NSSAI 3; the subscribed NSSAI of the first terminal; and the one or more pieces of S-NSSAI corresponding to the current user of the first terminal, for example, S-NSSAI 4. S-NSSAI 1 is replaced with S-NSSAI 4.

For example, as shown in FIG. 6, the message 9 in this embodiment of this application may be a slice selection request (slice selection request) message. This is not specifically limited in this embodiment of this application.

S613. The NSSF network element sends a message 10 to the first AMF network element, so that the first AMF network element receives the message 10 from the NSSF network element.

Optionally, in a possible implementation, the message 10 carries the allowed NSSAI corresponding to the first terminal and information about a second AMF network element that can serve the network slice indicated in the one or more pieces of S-NSSAI corresponding to the current user of the first terminal.

Alternatively, optionally, in a possible implementation, the message 10 carries the allowed NSSAI corresponding to the first terminal and information about a set of a candidate AMF that can serve the network slice indicated in the one or more pieces of S-NSSAI corresponding to the current user of the first terminal, so that the first AMF network element can select, from the candidate AMF set based on the information about the candidate AMF set, the second AMF network element that can serve the network slice indicated in the one or more pieces of S-NSSAI corresponding to the current user of the first terminal. This is not specifically limited in this embodiment of this application.

In this embodiment of this application, the allowed NSSAI corresponding to the first terminal includes the one or more pieces of S-NSSAI corresponding to the current user of the first terminal.

For example, as shown in FIG. 6, the message 10 in this embodiment of this application may be, for example, a slice selection response (slice selection response) message. This is not specifically limited in this embodiment of this application.

S614. The first AMF network element sends a message 11 to the access device, so that the access device receives the message 11 from the first AMF network element.

The message 11 carries the information about the second AMF network element and the allowed NSSAI corresponding to the first terminal.

S615. The access device sends the message 11 to the second AMF network element, so that the second AMF network element receives the message 11 from the access device.

The message related to the first terminal may be redirected to the second AMF network element by using the foregoing steps S614 and S615.

For example, as shown in FIG. 6, the message 11 in this embodiment of this application may be a reroute non-access stratum (non-access stratum, NAS) message (reroute NAS message). This is not specifically limited in this embodiment of this application.

S616 is similar to step S413. For example, a difference lies in that the first AMF network element in step S413 is replaced with the second AMF network element in this embodiment of this application. For other related descriptions, refer to the embodiment in FIG. 4. Details are not described herein again.

Based on this solution, after the first AMF network element obtains the user characteristic information including the one or more pieces of S-NSSAI corresponding to the current user of the first terminal, if the first AMF network element cannot serve the network slice indicated in the one or more pieces of S-NSSAI, that is, a function of the first AMF network element is insufficient to provide a corresponding network capability such as a low latency or high reliability, AMF network element reselection may be triggered, to redirect the message related to the first terminal to the second AMF network element that can serve the network slice indicated in the one or more pieces of S-NSSAI.

The actions of the first AMF network element in the foregoing steps S601 to S616 may be performed by the processor 301 in the communications device 300 in FIG. 3 by invoking the application program code stored in the memory 303. This is not limited in this embodiment.

The foregoing mainly describes, from the perspective of interaction between network elements, the solutions provided in the embodiments of this application. It may be understood that to implement the foregoing functions, the first network device includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the first network device may be obtained through division based on the foregoing method examples. For example, each function module may be obtained through division for each function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 7:
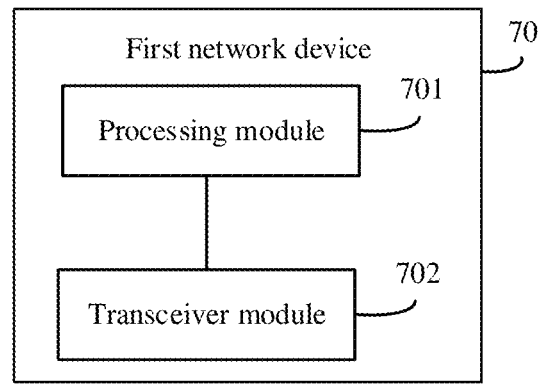
FIG. 7 is a schematic structural diagram of a first network device according to an embodiment of this application.

For example, when function modules are divided in an integrated manner, FIG. 7 is a schematic structural diagram of a first network device 70. The first network device 70 includes a processing module 701 and a transceiver module 702. The processing module 701 is configured to obtain user characteristic information of a current user of a first terminal, where the user characteristic information includes one or more pieces of S-NSSAI corresponding to the current user. The processing module 701 is further configured to determine, based on the user characteristic information, allowed NSSAI corresponding to the first terminal, where the allowed NSSAI includes the one or more pieces of S-NSSAI. Alternatively, the processing module 701 is configured to: when the first network device 70 does not support serving a network slice indicated in the one or more pieces of S-NSSAI, determine, based on the one or more pieces of S-NSSAI, a second network device that supports serving the network slice indicated in the one or more pieces of S-NSSAI.

Optionally, the transceiver module 702 is further configured to: after the processing module 701 determines the allowed NSSAI corresponding to the first terminal, send the allowed NSSAI to the first terminal, where the allowed NSSAI is used to indicate one or more network slices that the first terminal is allowed to access.

Optionally, that the processing module 701 is configured to obtain the user characteristic information of the current user of the first terminal includes: sending a first message to the first terminal, where the first message is used to request a user identifier of the current user of the first terminal; receiving the user identifier from the first terminal; and obtaining the user characteristic information of the current user of the first terminal based on the user identifier.

Optionally, that the processing module 701 is configured to obtain the user characteristic information of the current user of the first terminal based on the user identifier includes: sending a second message to a database network element or an authentication server, where the second message carries the user identifier and is used to request the user characteristic information of the current user of the first terminal; and receiving the user characteristic information from the database network element or the authentication server.

In a possible implementation, the transceiver module 702 is further configured to: before the processing module 701 obtains the user characteristic information of the current user of the first terminal, receive a third message from the first terminal, where the third message includes first indication information, and the first indication information is used to indicate that the first terminal has the user characteristic information. The processing module 701 is further configured to determine, based on the first indication information, that the first terminal has the user characteristic information.

Optionally, the third message includes requested NSSAI of the first terminal, and the first indication information is tag information in S-NSSAI included in the requested NSSAI of the first terminal.

In another possible implementation, the transceiver module 702 is further configured to: before the processing module 701 obtains the user characteristic information of the current user of the first terminal, receive subscription data of the first terminal from the database network element, where the subscription data includes second indication information, and the second indication information is used to indicate that the first terminal has the user characteristic information. The processing module 701 is further configured to determine, based on the second indication information, that the first terminal has the user characteristic information.

Optionally, the subscription data includes subscribed NSSAI of the first terminal, and the second indication information is tag information in S-NSSAI included in the subscribed NSSAI of the first terminal.

Optionally, that the processing module 701 is configured to determine, based on the one or more pieces of S-NSSAI, a second network device that supports serving the network slice indicated in the one or more pieces of S-NSSAI includes: sending a fourth message to a slice selection function network element, where the fourth message carries the one or more pieces of S-NSSAI, and is used to request a network device that supports serving the network slice indicated in the one or more pieces of S-NSSAI; and receiving information about the second network device from the slice selection function network element.

Alternatively, optionally, that the processing module 701 determines, based on the one or more pieces of S-NSSAI, a second network device that supports serving the network slice indicated in the one or more pieces of S-NSSAI includes: sending a fifth message to a slice selection function network element, where the fifth message carries the one or more pieces of S-NSSAI, and is used to request a network device that supports serving the network slice indicated in the one or more pieces of S-NSSAI; receiving information about a candidate network device set from the slice selection function network element; and selecting the second network device from the candidate network device set based on the information about the candidate network device set.

All related content of the steps in the foregoing method embodiments may be cited in function descriptions of the corresponding function modules. Details are not described herein again.

In this embodiment, the first network device 70 is presented in a form of dividing the function modules in the integrated manner. The "module" herein may be a particular ASIC, a circuit, a processor that executes one or more software or firmware programs and a memory, an integrated logic circuit, and/or another device that can provide the foregoing functions. In a simple embodiment, a person skilled in the art may figure out that the first network device 70 may be implemented in a form in FIG. 3.

For example, the processor 301 in FIG. 3 may invoke the computer executable instruction stored in the memory 303, to enable the first network device 70 to perform the network slice selection method in the foregoing method embodiment.

Specifically, functions/implementation processes of the transceiver module 702 and the processing module 701 in FIG. 7 may be implemented by the processor 301 in FIG. 3 by invoking the computer executable instruction stored in the memory 303. Alternatively, a function/implementation process of the processing module 701 in FIG. 7 may be implemented by the processor 301 in FIG. 3 by invoking the computer executable instruction stored in the memory 303, and a function/implementation process of the transceiver module 702 in FIG. 7 may be implemented by using the communications interface 304 in FIG. 3.

Because the first network device provided in this embodiment can perform the network slice selection method in the foregoing method embodiments, for a technical effect that can be obtained by the first network device, refer to the foregoing method embodiments. Details are not described herein again.

Optionally, an embodiment of this application further provides a chip system. The chip system includes a processor, configured to support a first network device in implementing the network slice selection methods in the foregoing method embodiments, for example, obtaining user characteristic information of a current user of a first terminal. In a possible design, the chip system further includes a memory. The memory is configured to store a program instruction and data that are necessary for the first network device. Certainly, the memory may not be in the chip system. The chip system may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

What is claimed is:

1. A network slice selection method, comprising:
    obtaining, by a first network device, user characteristic information of a user of a first terminal, wherein the user characteristic information includes one or more pieces of single network slice selection assistance information (S-NSSAI) corresponding to the user, comprising:
        sending, by the first network device, a first message to the first terminal, wherein the first message is useable to request a user identifier of the user of the first terminal;
        receiving, by the first network device, the user identifier from the first terminal; and
        obtaining, by the first network device, the user characteristic information of the user of the first terminal based on the user identifier;
        sending, by the first network device, a second message to a database network element or an authentication server, wherein the second message carries the user identifier and is useable to request the user characteristic information of the user of the first terminal; and
        receiving, by the first network device, the user characteristic information from the database network element or the authentication server; and
    determining, by the first network device based on the user characteristic information, allowed NSSAI corresponding to the first terminal, wherein the allowed NSSAI includes the one or more pieces of S-NSSAI; or
    in response to the first network device not supporting serving a network slice indicated in the one or more pieces of S-NSSAI, determining, by the first network device based on the one or more pieces of S-NSSAI, a second network device that supports serving the network slice indicated in the one or more pieces of S-NSSAI.

2. The method according to claim 1, further comprising:
    in response to the determining, by the first network device, the allowed NSSAI corresponding to the first terminal, sending, by the first network device, the allowed NSSAI to the first terminal, wherein the allowed NSSAI is configured indicate one or more network slices that the first terminal is allowed to access.

3. The method according to claim 1, further comprising:
    before the obtaining, by the first network device, the user characteristic information of the user of the first terminal, receiving, by the first network device, a third message from the first terminal, wherein the third message includes first indication information useable to indicate that the first terminal has the user characteristic information.

4. The method according to claim 3, wherein:
    the third message includes requested NSSAI of the first terminal, and the first indication information is tag information in S-NSSAI included in the requested NSSAI of the first terminal.

5. The method according to claim 1, further comprising:
    before the obtaining, by the first network device, the user characteristic information of the user of the first terminal, obtaining, by the first network device, subscription data of the first terminal from the database network element, wherein the subscription data includes second indication information useable to indicate that the first terminal has the user characteristic information.

6. The method according to claim 5, wherein:
    the subscription data includes subscribed NSSAI of the first terminal, and the second indication information is tag information in S-NSSAI included in the subscribed NSSAI of the first terminal.

7. The method according to claim 1, wherein:
    the determining, by the first network device based on the one or more pieces of S-NSSAI, the second network device that supports serving the network slice indicated in the one or more pieces of S-NSSAI comprises:
        sending, by the first network device, a fourth message to a slice selection function network element, wherein the fourth message carries the one or more pieces of S-NSSAI, and is configured to be useable to request another network device that supports serving the network slice indicated in the one or more pieces of S-NSSAI; and
        receiving, by the first network device, information about the second network device from the slice selection function network element.

8. The method according to claim 7, wherein:
    the determining, by the first network device based on the one or more pieces of S-NSSAI, the second network device that supports serving the network slice indicated in the one or more pieces of S-NSSAI comprises:
        sending, by the first network device, a fifth message to a slice selection function network element, wherein the fifth message carries the one or more pieces of S-NSSAI, and is useable to request the other network device that supports serving the network slice indicated in the one or more pieces of S-NSSAI;
        receiving, by the first network device, information about a candidate network device set from the slice selection function network element; and
        selecting, by the first network device, the second network device from the candidate network device set based on the information about the candidate network device set.

9. A first network device, comprises:
a processor; and
a transceiver, wherein:
   the processor is configured to obtain user characteristic information of a user of a first terminal, wherein the user characteristic information includes one or more pieces of single network slice selection assistance information (S-NSSAI) corresponding to the user;
   the processor is configured to send a first message to the first terminal, wherein the first message is useable to request a user identifier of the user of the first terminal;
   the processor is configured to receive the user identifier from the first terminal;
   the processor is configured to obtain the user characteristic information of the user of the first terminal based on the user identifier;
   the processor is configured to send a second message to a database network element or an authentication server, wherein the second message carries the user identifier and is useable to request the user characteristic information of the user of the first terminal;
   the processor is configured to receive the user characteristic information from the database network element or the authentication server; and
   the processor is configured to determine, based on the user characteristic information, allowed NSSAI corresponding to the first terminal, wherein the allowed NSSAI includes the one or more pieces of S-NSSAI; or
   the processor is configured to in response to the first network device not supporting serving a network slice indicated in the one or more pieces of S-NSSAI, determine, based on the one or more pieces of S-NSSAI, a second network device that supports serving the network slice indicated in the one or more pieces of S-NSSAI.

10. The first network device according to claim 9, wherein
the transceiver is configured to: after the processor determines the allowed NSSAI corresponding to the first terminal, send the allowed NSSAI to the first terminal, wherein the allowed NSSAI indicates one or more network slices that the first terminal is allowed to access.

11. The first network device according to claim 9, wherein:
   before the processor obtains the user characteristic information of the user of the first terminal, the transceiver is configured to receive a third message from the first terminal, wherein the third message includes first indication information to indicate that the first terminal has the user characteristic information.

12. The first network device according to claim 11, wherein:
   the third message includes requested NSSAI of the first terminal, and the first indication information is tag information in S-NSSAI included in the requested NSSAI of the first terminal.

13. The first network device according to claim 9, wherein:
   before the processor obtains the user characteristic information of the user of the first terminal, the transceiver is configured to obtain subscription data of the first terminal from the database network element, wherein the subscription data includes second indication information, and the second indication information indicates that the first terminal has the user characteristic information.

14. The first network device according to claim 13, wherein:
   the subscription data includes subscribed NSSAI of the first terminal, and the second indication information is tag information in S-NSSAI included in the subscribed NSSAI of the first terminal.

15. The first network device according to claim 9, wherein:
   the determining, based on the one or more pieces of S-NSSAI, a second network device that supports serving the network slice indicated in the one or more pieces of S-NSSAI comprises:
      send a fourth message to a slice selection function network element, wherein the fourth message carries the one or more pieces of S-NSSAI, and is useable to request another network device that supports serving the network slice indicated in the one or more pieces of S-NSSAI; and
      receive information about the second network device from the slice selection function network element.

16. The first network device according to claim 15, wherein:
   the determining, based on the one or more pieces of S-NSSAI, the second network device that supports serving the network slice indicated in the one or more pieces of S-NSSAI comprises:
      send a fifth message to the slice selection function network element, wherein the fifth message carries the one or more pieces of S-NSSAI, and is useable to request the other network device that supports serving the network slice indicated in the one or more pieces of S-NSSAI;
      receive information about a candidate network device set from the slice selection function network element; and
      select the second network device from the candidate network device set based on the information about the candidate network device set.

17. A network slice selection apparatus, comprising:
a processor; and
a memory having instructions stored thereon that, in response to being executed by the processor, cause the processor to:
   obtain user characteristic information of a user of a first terminal, wherein the user characteristic information includes one or more pieces of single network slice selection assistance information includes (S-NSSAI) corresponding to the user, comprising:
      send a first message to the first terminal, wherein the first message is useable to request a user identifier of the user of the first terminal;
      receive the user identifier from the first terminal; and
      obtain the user characteristic information of the user of the first terminal based on the user identifier;
      send a second message to a database network element or an authentication server, wherein the second message carries the user identifier and is useable to request the user characteristic information of the user of the first terminal; and
      receive the user characteristic information from the database network element or the authentication server; and determine, based on the user characteristic information, allowed NSSAI corresponding to the first terminal, wherein the allowed NSSAI includes the one or more pieces of S-NSSAI; or in response to a first network device not supporting serving a network slice indicated in the one or more pieces of S-NSSAI, determine, based on the one or more pieces of S-NSSAI, a second network device that supports serving the network slice indicated in the one or more pieces of S-NSSAI.

18. The apparatus according to claim 17, wherein the instructions, in response to being executed by the processor, further cause the processor to:

in response to the determining, by the first network device, the allowed NSSAI corresponding to the first terminal, send the allowed NSSAI to the first terminal, wherein the allowed NSSAI is configured to be useable to indicate one or more network slices that the first terminal is allowed to access.

19. The apparatus according to claim 17, wherein the instructions, in response to being executed by the processor, further cause the processor to:

before the obtaining the user characteristic information of the user of the first terminal, receive a third message from the first terminal, wherein the third message includes first indication information indicates that the first terminal has the user characteristic information.

20. The apparatus according to claim 19, wherein:

the third message includes requested NSSAI of the first terminal, and the first indication information is tag information in S-NSSAI included in the requested NSSAI of the first terminal.

\* \* \* \* \*